United States Patent [19]

Muller et al.

[11] 3,707,832

[45] Jan. 2, 1973

[54] FILTER AND FILTER SUPPORT APPARATUS

[75] Inventors: Charles B. Muller, Houston, Tex.; Fred C. Jones, Addison, N.Y.

[73] Assignee: Scientific Glass Blowing Company, Houston, Tex.

[22] Filed: Aug. 12, 1970

[21] Appl. No.: 63,086

[52] U.S. Cl. .....................55/486, 55/493, 55/502, 55/503, 55/511, 210/445, 210/490
[51] Int. Cl. ..............................................B01d 50/00
[58] Field of Search........55/486, 493, 502, 503, 511, 55/523; 210/445, 446, 489, 490

[56] References Cited

UNITED STATES PATENTS

| | | | |
|---|---|---|---|
| 1,476,138 | 12/1923 | Bingay | 55/503 X |
| 2,553,763 | 5/1951 | Hammon | 55/503 X |
| 2,826,265 | 3/1958 | Woody | 55/523 X |
| 3,015,228 | 1/1962 | Shuttleworth et al. | 55/502 X |
| 3,455,455 | 7/1969 | Ludvig et al. | 210/445 X |

*Primary Examiner*—Robert L. Lindsay, Jr.
*Attorney*—James L. Jackson

[57] ABSTRACT

A filter and filter support apparatus according to the present invention comprises conduit sections having external flanges. A filter assembly is interposed between the flanges and includes a porous structural element having a resilient sealing periphery bonded to the outer periphery thereof and disposed in sealed engagement with both of the flanges. The resilient sealing periphery is provided with an inner peripheral recess disposed in co-planar relation with the upper surface of the porous structural element to define a filter membrane recess in which is retained a filter membrane or the like held into assembly by one of the flanges. The porous structural portion of the porous structural element is so related to the resilient sealing periphery that the filter support assembly is oriented in centered relationship with the internal periphery of the conduit sections.

11 Claims, 4 Drawing Figures

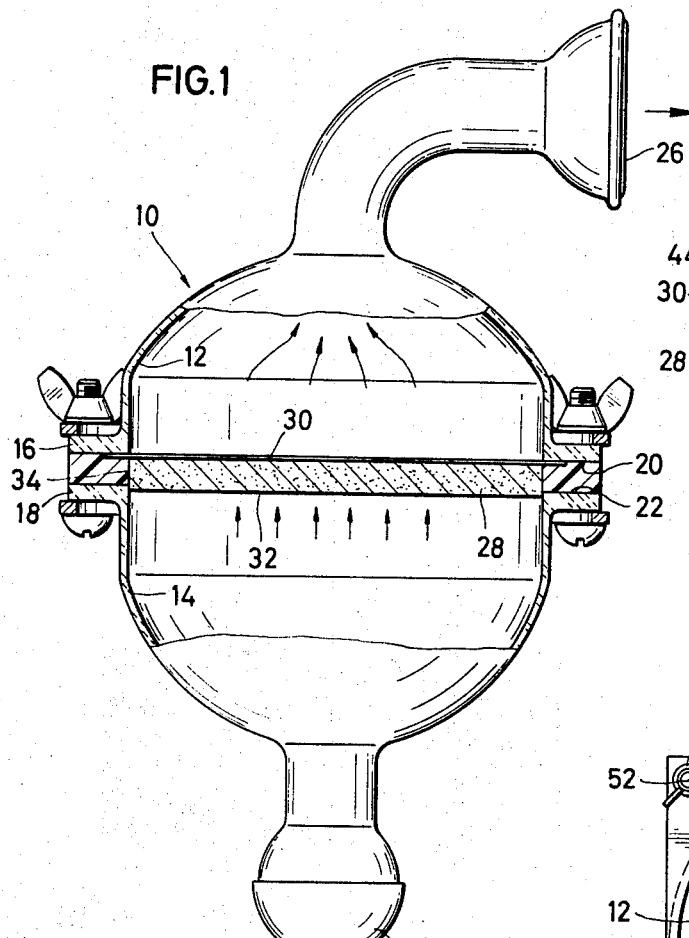
FIG.1
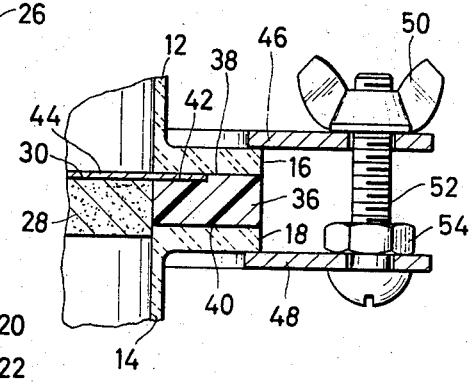
FIG.3
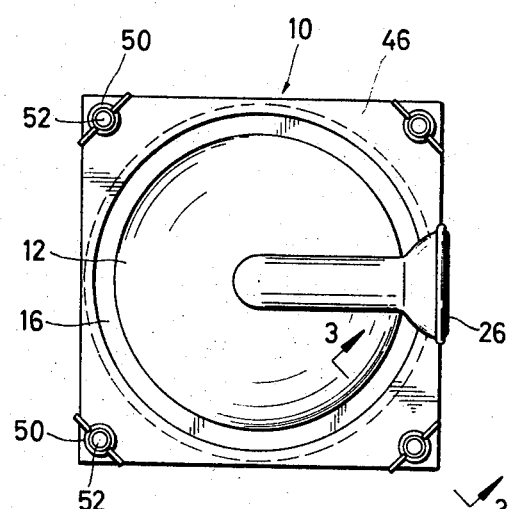
FIG.2
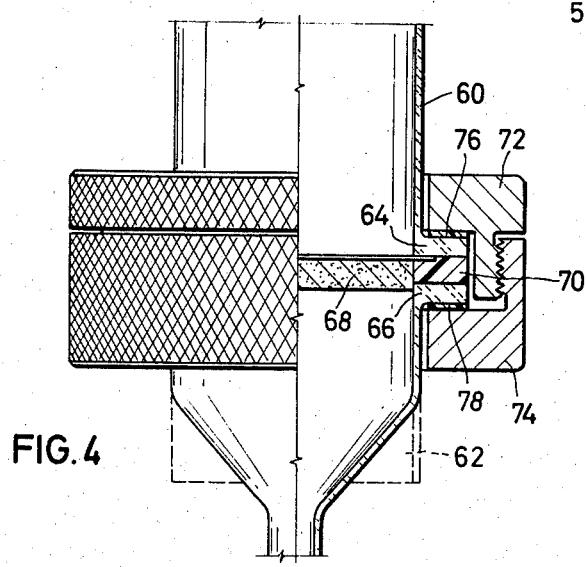
FIG.4
Charles B. Muller
Fred C. Jones
INVENTORS
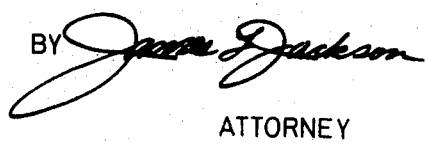
ATTORNEY

FILTER AND FILTER SUPPORT APPARATUS

BACKGROUND OF THE INVENTION

This invention relates generally to filter apparatus and more particularly to readily removable filter and filter support apparatus capable of separating entrained solids from gaseous fluids such as air.

Filters of this general nature generally comprise a filter mass that must be provided with gaskets or other sealing devices, located on either side thereof, in order to achieve proper sealing against surfaces between which the filter mass is retained. Such structure is usually quite costly because separate gaskets must be provided along with replacement filter assemblies. It is frequently difficult to establish a positive seal between the filter structure and the sealing elements when the filter elements are composed entirely of porous material such as fritted glass, metal or ceramic material. The porous nature of fritted glass material makes sealing with additional gaskets an extremely difficult procedure thereby requiring additional and frequently expensive filter joint assembly structure in order to assure development of a positive seal at the filter joint.

Most filters are frequently replaced with clean filter mass or filtering surfaces after the filter has been in service for a period of time. It is necessary that the filter joint be as simple as possible so that the procedure for replacement of the filter mass is not complicated to the extent that the filter product is rendered uncompetitive.

Filter masses or screens are frequently overlaid with a test membrane composed of various types of filter paper or other suitable foraminous membranes and tests are conducted whereby the filter mass and filter membrane cooperate to collect solid particulate from the gasiform fluid passed therethrough. The filter mass may then be weighed in order to determine the size and character of the contaminants entrained in the gasiform fluid. Accuracy of a test of this nature is questionable when the filter mass is substantially larger or smaller than the internal diameter of the conduit through which the fluid is passed because particulate can become entrapped within interstices of the filter mass extending beyond the wall structure of the conduit.

SUMMARY OF THE INVENTION

The present invention, therefore, has for an important object the overcoming of the above mentioned difficulties, in the provision of filter and filter support apparatus, by the employment of novel filter and filter support apparatus that includes a filter membrane support, defining a rigid porous mass, and having the capability of providing a structural support as well as providing a filtering capability.

It is another object of the present invention to provide a novel filter and filter support apparatus that includes a rigid porous filter membrane support mass provided with a resilient periphery allowing securing of filter paper between the resilient periphery and a flange of the filter joint.

Among the several objects of the present invention is noted the contemplation of novel filter and filter support apparatus that establishes positive sealing with a pair of filter joint flanges without the necessity of providing additional sealing gaskets or other sealing construction apparatus to establish a sealed joint.

It is also another object of the present invention to provide a novel filter and filter support apparatus that is readily replaceable without involving excessive time or effort in the replacement operation.

It is an even further object of the present invention to provide novel filter and filter support apparatus utilizing a filter support member that provides filtering capability when utilized without a filter membrane.

It is an even further object of the present invention to provide novel filter and filter support apparatus that is of specific cooperating configuration with the conduit and flange structure at the filter joint in order to promote proper orientation of the filter and filter joint parts during assembly.

A further object of the present invention includes the provision of novel filter and filter support apparatus that is simple in nature, reliable in use, and low in cost.

The above and other objects and novel features of the instant invention will be readily apparent from the following description taken in conjunction with the accompanying drawings. It is to be understood that the drawings are provided for the purpose of illustration and are not intended to define the limits of the invention, but rather merely illustrate preferred embodiments and structures incorporating the features of the present invention.

BRIEF DESCRIPTION OF THE DRAWINGS

In the accompanying drawings forming a part of this specification and wherein like reference numerals are employed to designate like parts:

FIG. 1 is an elevational view having parts thereof broken away and illustrated in section to show filter and filter support apparatus constructed in accordance with the present invention.

FIG. 2 is a fragmentary plan view of the filter and filter support apparatus of FIG. 1.

FIG. 3 is an enlarged fragmentary sectional view taken along line 3—3 in FIG. 2.

FIG. 4 is an elevational view having parts thereof broken away and shown in quarter section of a filter and filter support apparatus comprising a modified embodiment of the present invention and showing an alternate form of the invention in broken line.

BRIEF DESCRIPTION OF THE INVENTION

Briefly, the invention concerns conduit structure of any desired cross-sectional configuration that includes a pair of generally parallel flanges provided for the establishment of a sealed filter assembly joint. A filter support comprising a substantially rigid porous mass of fritted glass, metal, ceramic material or the like is provided with a resilient sealing periphery bonded thereto. The sealing periphery is disposed between the flanges in sealed relation therewith and the structural filtering mass is disposed with the outer periphery thereof in close fitting engagement within the conduit structure adjacent one of the flanges thereby properly orienting the rigid filtering mass relative to the flanges of the filter joint. The resilient sealing periphery is provided with an internal recess that is disposed in substantially co-planar relation with one of the planar surfaces of the rigid filter mass. The recess cooperates with one of the flanges at the filter joint to entrap the peripheral portion of a filter paper to retain the same in positive assembly at the filter joint. The assembly is maintained by any suitable structure such as parallel flanges secured into assembly with the conduit flanges by wing nuts or the like; or as an alternative the conduit flanges may be secured by suitable threaded connection members that bias the flanges into proper sealed assembly with the resilient periphery of the rigid filtering element. The materials from which the filter apparatus and conduit joint construction are composed is not intended to be limited, although the apparatus is designed particularly for conduit and conduit flange structure composed of glass or suitable plastic materials.

DETAILED DESCRIPTION OF PREFERRED EMBODIMENTS

With reference now to the drawings for a better understanding of the present invention, in FIG. 1 a filter apparatus is generally illustrated at 10 that includes conduit sections 12 and 14 having integral transverse flanges 16 and 18 defined respectively thereon. The conduits and conduit flanges are illustrated as being glass material, although any other suitable material such as plastic may be employed for construction thereof. The flanges 16 and 18 are provided respectively with substantially planar annular sealing surfaces 20 and 22 that may be surface ground or otherwise prepared in order to promote the establishment of a positive seal with resilient material disposed therebetween. The conduits may be of relatively straight cylindrical configuration or of tapered funnel-like configuration as illustrated in FIG. 4 or the conduits may be reduced in dimension as illustrated in FIG. 1 to provide suitable connection structure such as the male and female conventional spherical joints 24 and 26, respectively.

As illustrated in sectional view in FIG. 1, and in fragmentary enlarged sectional view in FIG. 3, a filter and filter support assembly is provided that includes a generally rigid filter mass 28 formed of particles of glass, metal or ceramic material that have been bonded together or sintered under heat. A filter mass of this nature is generally referred to as a fritted or sintered filter. The filter mass 28 is provided with upper and lower generally planar surfaces 30 and 32 respectively that may be disposed in parallel relation as illustrated in FIG. 1. The outer peripheral wall 34 of the filter mass 28 is slightly smaller than the internal dimension of the conduit 14 in order that a portion of the filter mass may be received in close fitting relation within the conduit for positive orientation of the filter mass relative to the conduit structure. Although the conduit structure and filter mass are illustrated in the drawings as being of cylindrical and circular configuration respectively, it is not intended that this particular configuration be taken as limiting. The conduit structure may be of any particular cross-sectional configuration, and it is merely necessary that the filter mass be of a cross-sectional configuration complementing the configuration of the conduit structure. For example, the conduit and filter mass may be of rectangular or elliptical configuration without departing from the spirit or scope of this invention.

For the purpose of establishing a positive seal between the parallel flanges 16 and 18 of the conduit structure, the filter mass 28 is provided with a resilient peripheral sealing portion 36 of a size and configuration complementing the configuration of the flanges 16 and 18. The resilient sealing portion 36 may be composed of any number of acceptable resilient materials such as a silastic material and is bonded to the outer peripheral surface 34 of the filter mass 28 by a silastic resin, epoxy resin, or the like. The bonding agent, in addition to positively securing the resilient sealing periphery to the filter mass, also achieves sealing of the pores of the filter mass at the outer peripheral surface, thereby preventing leakage through the filter mass at the joint established between flanges 16 and 18 and the resilient sealing periphery 36. Resilient sealing periphery 36 is provided with upper and lower generally parallel sealing surfaces 38 and 40 that engage the ground or prepared sealing surfaces 20 and 22 of flanges 16 and 18, respectively.

The resilient sealing periphery 36 is of less thickness or is offset relative to the filter mass 28, thereby allowing the lower portion of the filter mass to extend beyond the lower sealing surface 40 which allows the lower portion of the filter mass to be received within the conduit 14. This feature establishes proper orientation between the filter mass and the conduit and promotes ease of proper assembly. During assembly it is only necessary to shift the filter mass relative to the flange 18 until the lower portion of the filter mass 28 enters the aperture defined by the inner periphery of the conduit 14. This allows the lower sealing surface 40 of the sealing periphery 36 to move into proper abutting orientation with the sealing surface 22 of the flange 18.

The resilient sealing periphery 36 is provided with an internal offset surface 42 of generally planar relationship disposed in substantially co-planar relation with the upper surface 30 of the filter mass 28, thereby cooperating to define a recess to receive a filter membrane 44 of any one of various commercially available filter membranes, such as glass fiber filter membrane, for example. The planar surface 42 of the resilient sealing periphery 36 cooperates with the sealing surface 20 of flange 16 to entrap the outer periphery of the filter membrane 44 thereby securing the filter membrane in positive assembly with the filter mass 28. As the flanges 16 and 18 are brought into tight assembly, the resilient sealing periphery 36 is deformed, thereby squeezing the peripheral portion of the filter membrane 44 in order to positively lock the same in assembly with the filter mass 28.

As illustrated in FIG. 3, the flanges 16 and 18 are biased into sealing engagement with the resilient sealing periphery 36 by a pair of plate members 46 and 48 that may be of generally rectangular outer configuration, as illustrated in FIG. 2, or may be of any other suitable configuration within the spirit and scope of the present invention. A plurality of wing nuts 50 are received by a plurality of bolt members or machine screws 52 that extend through suitable apertures formed in the plate members 46 and 48. A lock nut 54 may be received by the machine screw 52 to positively secure the machine screw in assembly with one of the plate members, if desired.

As illustrated in quarter section in FIG. 4, a modified embodiment of this invention includes upper and lower conduit members 60 and 62 which may be of either generally cylindrical configuration or of tapered funnel-like configuration and is provided with integral flanges of the same general configuration as the flanges 16 and 18, illustrated in FIGS. 1 and 2. A filter mass 68, of the same general configuration as the filter mass 28 in FIG. 1, is provided with a resilient sealing periphery 76 disposed between the flanges 64 and 66. The flanges 64 and 66 are retained in sealed assembly with the sealing periphery 70 by threaded connection members 72 and 74 that may be threaded into assembly. Gasket members 76 and 78 may be interposed between the flanges 64 and 66 and the respective threaded connection members 72 and 74 in order to provide protection for the flanges in the event the flanges are composed of fragile material such as glass.

Installation of the filter and filter support assemblies shown in both FIGS. 1 and 4 may be achieved simply by orienting the filter mass 28 or 68 relative to the appropriate flange and conduit structure thereby causing entry of the lower portion of filter mass into close fitting relation within the conduit structure and thereby bringing the lower sealing surface of the resilient sealing periphery into abutment with the upper sealing surface of the appropriate flange 18 or 66. The filter membrane 44 may then be placed within the recess such as is defined by the cooperating co-planar surfaces 30 and 42 as illustrated in FIG. 3. The other conduit 12 or 60, with its associated flange, is brought into contact with the upper sealing surface of the sealing periphery of the filter mass. This flange also is disposed in abutment with the peripheral portion of the filter membrane 44. When this has been accomplished the retainer plates 46 and 48 may be brought into assembly with the flanges 16 or 18 as illustrated in FIG. 3 and the wing nuts 50 may be applied to the threaded machine screws 52 in order to bias the plates 46 and 48 into tight assembly for the purpose of establishing sealing between the resilient sealing periphery and the adjacent flanges 16 or 18. At the same time the resilient sealing periphery is deformed thereby reducing the dimension of the inner filter recess and positively securing the peripheral portion of the filter membrane in positive assembly with the filter mass.

With regard to FIG. 4 the threaded connection members 72 and 74 may be threaded into biasing assembly with the flanges 64 and 66 with or without the gasket members 76 and 78 being placed between the flanges and the connection members. It is obvious, therefore, that the filter and filter support assemblies of the present invention may be very simply removed and replaced without the necessity of providing special equipment for accomplishing removal and replacement thereof.

At times it may be desirable to install the filter mass alone without employing a filter membrane. Sealing is properly accomplished by the cooperating resilient sealing periphery and joint flanges even though a filter membrane may not be present. Since the filter membrane is positively supported in assembly with the filter mass, it is obvious that the filter mass and filter membrane may be oriented in any desirable manner relative to the direction of fluid flow without risking separation of the filter membrane from its supported position.

In view of the foregoing, it is apparent that we have provided a novel filter and filter support assembly utilizing a support element that also functions to separate entrained solids from the gasiform fluid flowing through the filter apparatus. Our invention also contemplates the provision of a resilient sealing periphery that is bonded to the peripheral portion of the filter mass in order to provide sealing capability with connection flanges thereby eliminating the necessity for providing additional sealing gaskets with the filter apparatus. We have also provided a unique filter and filter support connection structure that accomplishes securing of a filter membrane such as various acceptable filter papers into positive assembly with a filtering support mass without necessitating the provision of additional mechanical sealing elements that achieve this purpose. The filter and filter support structure of our invention also provides for optimum orientation of the filter relative to the conduit structure defining the filter joint so that proper assembly may be readily accomplished without undue difficulty. The joint defined by the filter and filter support assembly of our invention may be easily and manually disassembled without the necessity of providing special disassembly tools in order to allow replacement of the filter and filter support apparatus. It is readily understood therefore that our invention is well adapted to attain all of the objects and advantages hereinabove set forth together with other objects and advantages that are inherent in the apparatus itself. While certain representative embodiments and details thereof have been shown for the purpose of illustrating this invention, it will be apparent to those skilled in the art that various changes and modifications may be made therein without departing from the spirit or scope of my invention.

Having thus clearly disclosed and described my invention, I claim:

1. A filter assembly comprising conduit sections each having integral flanges formed thereon, a substantially rigid filter mass extending transversely of said conduit sections and having an imperforate resilient sealing periphery disposed between said flanges in sealed relation therewith, said rigid filter element and said resilient sealing periphery defining a recess extending beyond the periphery of said rigid filter element, a second filter element disposed within said recess and having its peripheral portion disposed between said flanges, means retaining said flanges in compressible assembly with said resilient sealing periphery and deforming said resilient sealing periphery to a degree causing one of said flanges to secure the periphery of said second filter element within said recess.

2. A filter assembly as recited in claim 1; said rigid filter element extending into one of said conduit sections to positively align said filter assembly relative to said conduit sections.

3. A filter assembly as recited in claim 1; said substantially rigid filter element comprising a porous mass having a porous peripheral surface, said resilient sealing periphery being bonded to the periphery of said rigid filter element and sealing said porous peripheral surface.

4. A filter assembly as recited in claim 1; said substantially rigid filter element comprising a porous mass having substantially parallel planar surfaces, said resilient sealing periphery being bonded to the periphery of said porous mass and having an internal recess disposed substantially co-planar with one of said planar surfaces of said porous mass, the other planar surface of said porous mass extending beyond said resilient sealing periphery and being received within one of said conduit sections to positively align said filter assembly with said conduit sections.

5. A filter assembly as recited in claim 4; plate members disposed in engagement with each of said flanges, a plurality of bolt and nut assemblies extending through apertures in said plates and biasing said plates toward said flanges to maintain said filter assembly in sealed relation.

6. A filter assembly as recited in claim 4; a threaded male connector disposed in engagement with one of said flanges, a threaded female connector disposed in engagement with another of said flanges, said connectors being threaded together to secure said flanges in sealed engagement with said resilient sealing periphery.

7. A filter assembly comprising conduit sections each having integral flanges formed thereon, a substantially rigid porous filter support mass being disposed between said flanges, an imperforate resilient sealing periphery being secured to the outer peripheral portion of said filter support mass and being disposed between said flanges, a second filter element being disposed on the upstream side of said filter support mass with the periphery thereof disposed between said resilient sealing periphery and one of said flanges, means retaining said flanges in compressible assembly with said resilient sealing periphery and said second filter element and securing said periphery of said second filter element therebetween, said resilient sealing periphery yielding upon assembly and developing a positive seal with said flanges.

8. A filter assembly comprising conduit sections each having integral flanges formed thereon, a substantially rigid foraminous filter mass extending transversely of said conduit sections and defining a porous peripheral surface, an imperforate resilient sealing periphery, bonding material sealing said porous peripheral surface and securing said resilient sealing periphery to said peripheral surface, said resilient sealing periphery being disposed between said flanges in sealed relation therewith, a portion of said peripheral surface of said filter mass extending beyond said resilient periphery and being received in close fitting relation within one of said conduit sections to positively orient said filter mass and said resilient sealing periphery with the flange of said one of said conduit sections, means securing said flanges said porous mass and said resilient sealing periphery into assembly.

9. A filter assembly as recited in claim 8; said porous filter mass and said resilient sealing periphery cooperating to define a recess extending beyond the inner periphery of said flanges, a foraminous filter membrane disposed within said recess, said flanges slightly deforming said resilient sealing periphery and securing the periphery of said membrane against said resilient sealing periphery.

10. A filter assembly as recited in claim 8; bonding means sealing said porous peripheral surface and bonding said resilient sealing periphery to said sealed peripheral surface.

11. A filter assembly as recited in claim 8; said porous filter mass having at least one substantially planar surface, said resilient sealing periphery having a generally planar surface disposed substantially coplanar with said substantially planar surface of said porous filter mass and cooperating to define a filter membrane support surface, a filter membrane being supported by said membrane support surface, the outer portion of said resilient sealing periphery extending beyond said substantially planar surface of said porous filter mass and engaging one of said flanges of said conduit sections, said means securing said flanges said porous mass and said resilient sealing periphery into assembly causing deformation of said resilient sealing periphery by said flanges and securing the periphery of said filter membrane in assembly between one of said flanges and said resilient sealing periphery.

* * * * *